C. GROTHE.
ATTACHMENT FOR MOTOR VEHICLES.
APPLICATION FILED JAN. 21, 1913.
1,091,746.  Patented Mar. 31, 1914.
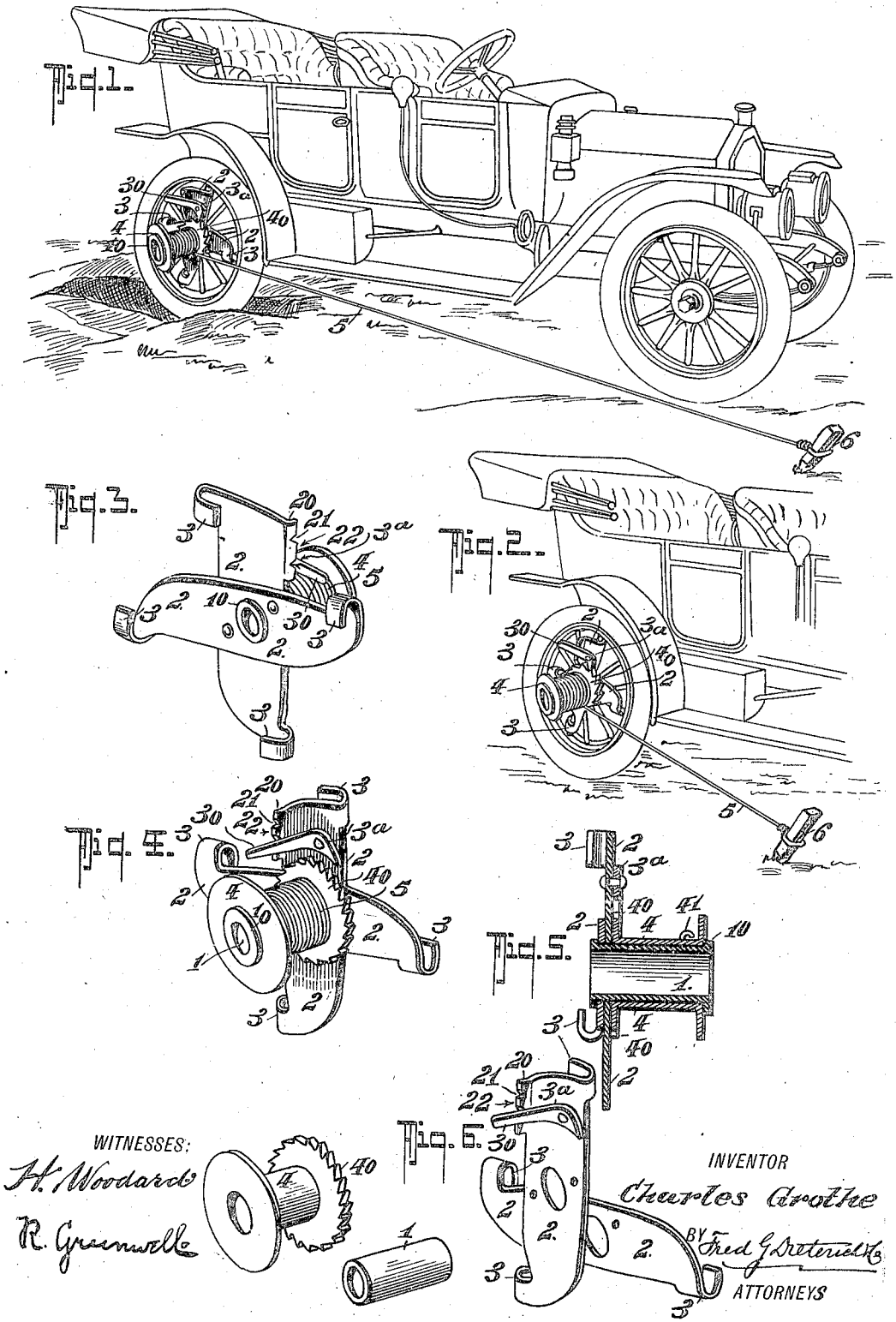
WITNESSES:
H. Woodard
R. Greenwell
INVENTOR
Charles Grothe
BY Fred G. Dieterich
ATTORNEYS

UNITED STATES PATENT OFFICE.

CHARLES GROTHE, OF YELTON, OKLAHOMA.

ATTACHMENT FOR MOTOR-VEHICLES.

1,091,746.

Specification of Letters Patent. Patented Mar. 31, 1914.

Application filed January 21, 1913. Serial No. 743,389.

*To all whom it may concern:*

Be it known that I, CHARLES GROTHE, residing at Yelton, in the county of Harper and State of Oklahoma, have invented a new and Improved Attachment for Motor-Vehicles, of which the following is a specification.

My invention has for its object to provide a simple and inexpensive attachment that may be applied to the wheel of any ordinary motor vehicle and used to assist in pulling the vehicle out of ruts or mud, etc.

Another, and important object of my invention is to provide an attachment for the purpose stated that can be easily applied to a driving wheel of the vehicle, and which after having exerted its function can be as quickly removed, the said attachment being especially designed for being connected to or removed from the driving wheel without the use of bolts or other adjustable clamping means, and which, when not in use, can be carried in the usual tool box with other tool accessories.

With other objects in view, that will hereinafter appear, my invention resides in an attachment of the character stated that embodies the peculiar construction and novel arrangement of parts, all of which will be hereinafter fully explained, specifically pointed out in the appended claims and illustrated in the accompanying drawing, in which:—

Figure 1 is a perspective view of my invention, the same being shown applied for use, so much of a motor vehicle being shown as is necessary to illustrate the practical application of my invention, the cable drum being loose to provide for moving the pulley or anchor stake to the desired point. Fig. 2 is a similar view, the drum being clutched to turn with the driving wheel, the draft pull on the machine being indicated by the arrow. Fig. 3 is a perspective view of the attachment seen from the innerside. Fig. 4 is a similar view thereof as seen from the outside. Fig. 5 is a longitudinal section of the same. Fig. 6 illustrates, in perspective, the several parts that constitute the cable holding and winding means separated and before finished up.

In the practical arrangement my attachment is composed essentially of two main parts including a tubular hub adapted for being slipped upon the hub of a driving wheel of a motor vehicle, it being understood that the hub feature of my attachment may be varied and include such modifications in cross sectional shape so as to adapt it for the particular makes of wheel hubs for which it may be utilized. The hub part also includes clamping portions adapted for being first slipped into position between the spokes of the wheel and to become interlocked with the wheel, when the latter is moving in a driving direction. The other main part of my attachment, is a drum or sleeve that loosely turns on the hub part and includes a ratchet disk. A third or minor part being also included, in the nature of a pawl or dog mounted on the spoke engaging or clamping portion for being moved into or out of engagement with the ratchet disk.

In the drawing, I have shown the hub 1, and spoke integrally formed with a plurality of radially extended arms 2, the ends have lateral extensions which are turned inwardly and backwardly to form clawlike hooks 3, these being provided to fit over the front edge of the vehicle spokes—it being apparent that while the hooks provide for an effective clamping of the hub to the wheel spokes, the said hub and hook members can be instantly removed from the vehicle spokes by turning the hook forwardly to disengage the said spokes.

One edge of one of the arms 2 is formed with a flange 20 that is notched as at 21, and the said flange, when the parts are assembled for use, is bent up at right angles to form a locking rack 22, for coacting with the spring end 30 of a pawl 3ª pivoted on the arm 2 so its end moves over the rack 22.

4 designates a drum or sleeve that is loosely mounted on the vehicle hub 1, has an integral ratchet disk 40 with which the pawl 3ª is held to engage, and the said sleeve is held on the said hub 1 by the flange 10 on the outer end of the said hub that is turned up after the sleeve 4 is placed in position. Drum or sleeve 4 has an integral hook 41 to which one end of a pull cable 5 may be readily connected.

6 designates an anchoring stake connected to one end of the cable. While I have shown a stake to be used at the anchoring means, it is obvious that the free end of the cable may be connected to a tree or other fixed object sufficient to withstand the required pull strain.

The manner in which my invention may be used is as follows: In case the motor vehicle gets "stuck" for any of the usual causes, one of my attachments is slipped onto the hub of one of the driving wheels or if desired an attachment may be applied to both of the driving wheels. The pawl 3 is then shifted to release the sleeve 4 and the stake is carried forwardly (or backwardly), to solid ground and anchored, after which the pawl or latch 3 is again moved into engagement with the ratchet disk 40. The motor is then started the same as if the vehicle were not "stuck," its pulling power now causing the sleeve to wind up the cable and in consequence the machine is drawn in direction of the cable anchorage, it being observed that in doing so the sleeve winds up the cable and when the stake is reached the cable will be all wound back on the drum the same as it was—leaving the attachment in shape for ready removal, and to be returned to the tool box.

What I claim is:

1. An attachment for the driving wheels of motor vehicles, comprising a tubular hub adapted to fit upon the wheel hub, a drum loosely mounted on said tubular hub, at least one member projecting radially from the tubular hub and provided with an open hook portion to interlock with a spoke of the wheel when the wheel is being turned forwardly, means for clutching the drum to cause it to move with said tubular hub, and a flexible element for one end secured to said drum to wind thereon, said open hook portion being so arranged that upon reverse relative rotation between the wheel and the tubular hub, the said hook portion will become disengaged from the spoke.

2. In an attachment for the driving wheels of motor vehicles, a tubular hub adapted for fitting onto the wheel hub and having a radial member provided with a hook portion open at one side to engage the vehicle spoke when turned in one direction relatively to the wheel and adapted to disengage the spoke when turned relatively in an opposite direction, a drum loosely mounted on the said tubular hub, a ratchet and pawl connection for joining the drum and the hub, and a flexible draft member connected to the drum.

3. In an attachment for drawing wheels of motor vehicles, a tubular hub adapted for loosely fitting on the vehicle hub, said tubular hub including radial arms having inturned hooks for clamping over one edge of the wheel spokes, and to become disengaged from the said spokes when turned out of alinement therewith, a cable winding drum loosely mounted on the said tubular hub, and a pawl and ratchet connection for joining the said drum and the tubular hub member.

4. An attachment for motor vehicle driving wheels, comprising a tubular hub having integral radial arms at one end and an annular flange at the other end, the said arms having the upper ends bent to form hooks for slipping over the edges of the spokes, one of the said arms having an integral toothed flange on its outer face, a drum loosely mounted on the tubular hub between its arms and its annular flange, said drum having a ratchet disk, a pawl mounted on one of the arms to engage the disk and including an extension for engaging and interlocking with the toothed flange on the arm, and draft cable connected to the drum.

5. An attachment for the purposes described, comprising a tubular hub adapted for loosely fitting onto the vehicle wheel hub, and including one or more radial arms having portions for extending between the spokes, cable winding drum loosely mounted on the tubular hub; means for interlockably engaging the arms and the drum on a driving movement of the arms, the said arm portions that extend between the spokes being arranged to interlock with the spokes to move the drum with the spokes on the forward or driving movement only of the wheel.

CHARLES GROTHE.

Witnesses:
EDD CASEY,
E. E. ALEXANDER.

---

Copies of this patent may be obtained for five cents each, by addressing the "Commissioner of Patents, Washington, D. C."